United States Patent
Lee

(10) Patent No.: US 9,674,697 B2
(45) Date of Patent: Jun. 6, 2017

(54) METHOD FOR OPERATING MOBILE DEVICE, MOBILE DEVICE USING THE SAME, WEARABLE DEVICE USING THE SAME, AND COMPUTER READABLE MEDIUM

(71) Applicant: HTC Corporation, Taoyuan County (TW)

(72) Inventor: Yu-Cheng Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 40 days.

(21) Appl. No.: 14/328,723

(22) Filed: Jul. 11, 2014

(65) Prior Publication Data
US 2015/0031333 A1    Jan. 29, 2015

Related U.S. Application Data

(60) Provisional application No. 61/857,707, filed on Jul. 24, 2013, provisional application No. 61/907,399, filed on Nov. 22, 2013.

(51) Int. Cl.
*H04W 12/02* (2009.01)
*H04B 1/3827* (2015.01)
(Continued)

(52) U.S. Cl.
CPC ............ *H04W 12/02* (2013.01); *H04B 1/385* (2013.01); *H04M 1/7253* (2013.01);
(Continued)

(58) Field of Classification Search
CPC ... H04W 12/02; H04W 12/06; H04M 1/7253; H04M 2250/12; H04M 1/72519; H04B 1/385; H04B 2001/3861
See application file for complete search history.

(56) References Cited

U.S. PATENT DOCUMENTS

2010/0030695 A1   2/2010   Chen et al.
2011/0018731 A1*  1/2011   Linsky .................... G06F 1/163
                                                          715/863
(Continued)

FOREIGN PATENT DOCUMENTS

CN   102273184   12/2011
CN   102566749    7/2012
(Continued)

OTHER PUBLICATIONS

"Notice of Allowance of Taiwan Counterpart Application," issued on Sep. 18, 2015, p. 1-5, in which the listed references were cited.
(Continued)

*Primary Examiner* — Nathan Mitchell
(74) *Attorney, Agent, or Firm* — Jianq Chyun IP Office

(57) ABSTRACT

The present disclosure provides a method, electronic devices, and a computer readable medium for operating a mobile electronic device based on motion coherence between movements of the mobile electronic device and a wearable electronic device without providing an input. In the disclosure, the mobile electronic would receive a first motion data representing a movement of the wearable electronic device through a transceiver. The mobile electronic device would detect a second motion data representing a movement of the mobile electronic device. Then, the mobile electronic device would calculate a difference between the first motion data with the second motion data. If the difference between the first motion data and the second motion data is within a predetermined threshold, the mobile electronic device would execute an operation in response to the motion coherence between the mobile electronic device and the wearable electronic device.

22 Claims, 9 Drawing Sheets

(51) Int. Cl.
*H04M 1/725* (2006.01)
*H04W 12/06* (2009.01)

(52) U.S. Cl.
CPC . *H04B 2001/3861* (2013.01); *H04M 1/72519* (2013.01); *H04M 2250/12* (2013.01); *H04W 12/06* (2013.01)

(56) References Cited

U.S. PATENT DOCUMENTS

| | | | | |
|---|---|---|---|---|
| 2013/0288718 | A1* | 10/2013 | MacGougan | H04W 52/0274 455/456.4 |
| 2014/0051346 | A1* | 2/2014 | Li | H04H 20/59 455/3.01 |
| 2014/0171156 | A1* | 6/2014 | Pattikonda | H04M 1/7253 455/569.1 |
| 2014/0266160 | A1* | 9/2014 | Coza | G01B 7/003 324/207.11 |
| 2014/0273849 | A1* | 9/2014 | Lee | G06F 3/017 455/41.2 |
| 2014/0282877 | A1* | 9/2014 | Mahaffey | H04L 63/0853 726/3 |
| 2014/0350883 | A1* | 11/2014 | Carter | A61B 5/6802 702/141 |
| 2014/0378185 | A1* | 12/2014 | Chung | G06F 1/163 455/557 |
| 2015/0028996 | A1* | 1/2015 | Agrafioti | G06F 21/40 340/5.82 |
| 2015/0065055 | A1* | 3/2015 | Newham | H04W 4/008 455/41.3 |
| 2015/0141076 | A1* | 5/2015 | Libin | H04W 4/003 455/557 |

FOREIGN PATENT DOCUMENTS

| | | |
|---|---|---|
| TW | 200919390 | 5/2009 |
| TW | I347179 | 8/2011 |
| TW | I386631 | 2/2013 |

OTHER PUBLICATIONS

"Office Action of China Counterpart Application", issued on Dec. 28, 2016, p1-p7, in which the listed references were cited.

* cited by examiner

METHOD FOR OPERATING MOBILE DEVICE, MOBILE DEVICE USING THE SAME, WEARABLE DEVICE USING THE SAME, AND COMPUTER READABLE MEDIUM

CROSS REFERENCE TO RELATED APPLICATION

This application claims the priority benefit of U.S.A. provisional application Ser. No. 61/857,707, filed on Jul. 24, 2013, and U.S.A. provisional application Ser. No. 61/907, 399, filed on Nov. 22, 2013. The entirety of each of the above-mentioned patent applications is hereby incorporated by reference herein and made a part of specification.

TECHNICAL FIELD

The present disclosure is related to a method for operating mobile device, mobile device using the same, wearable device using the same, and computer readable medium.

BACKGROUND OF THE DISCLOSURE

Having diverse functions may allow electronic devices such as a smart phone, a tablet computer, a personal digital assistant (PDA) and the likes to become more mobile and versatile. Therefore, such electronic device has become an essential element for storing personal and private information regarding an individual. For example, the electronic devices may have information for directly accessing a financial institute through web to manage one's financial related stuff. Furthermore, in a case of smart phone, phone calls may be placed by others without one's supervision. The individual who registered as owner on the server would be responsible for the phone calls. Therefore, it is crucial to protect the information stored in the electronic devices and the usage from other.

In the conventional art, different types of security check could be utilized to protect the information stored in the electronic devices, such as password protection or graphical pattern. However, there are still chances others may unlock the electronic devices through the finger print residue remained on the touch screen or input device. The electronic devices would not know the difference between the individual and others as long as a password or a graphical pattern is provided.

Furthermore, in the case of an incoming event such as a phone call, a text message, or a calendar event, the individual would have to provide an input through an input device such as a physical button or touch screen. For example, the individual would have to provide a tapping or sliding operations in order to answer an incoming call.

In order to manipulate these electronic devices, regardless whether a password is inserted to unlock the electronic devices or an input is provided for answering incoming calls, these operations could be deemed as rather inconvenient and superfluous by users of these devices. Consequently, there could be a need to provide a better technique of performing a security check that would be more convenient.

SUMMARY OF THE DISCLOSURE

The present disclosure proposes a method, electronic devices and a computer readable medium for operating the electronic device.

In the present disclosure, a method for operating a mobile electronic device is provided. The method for operating a mobile electronic device would include at least, but not limited to, receiving a first motion data through a transceiver, detecting a second motion data representing a movement of the mobile electronic device, calculating a difference between the first motion data and the second motion data, wherein the first motion data and the second motion data are measured during a same period, and executing an operation when the difference between the first motion data and the second motion data is within a predetermined threshold.

In the present disclosure, a mobile electronic device is provided. The mobile electronic device would include at least, but not limited to, a transceiver, a sensor, and a processor. The transceiver is configured for receiving a first motion data. The sensor is configured for detecting a second motion data representing a movement of the mobile electronic device. In addition, the processor is configured for obtaining the second motion data and the first motion data, calculating a difference between the first motion data and the second motion data is within a predetermined threshold, wherein the first motion data and the second motion data are measured during a same period, and executing an operation when the difference between the first motion data and the second motion data is within a predetermined threshold.

In the present disclosure a non-transitory computer readable medium storing programs to be loaded into a mobile electronic device is provided. The mobile electronic device is configured to perform at least, but not limited to, receiving a first motion data through a transceiver, detecting a second motion data representing a movement of the mobile electronic device, calculating a difference between the first motion data and the second motion data is within a predetermined threshold, wherein the first motion data and the second motion data are measured during a same period, and executing an operation when the difference between the first motion data and the second motion data is within a predetermined threshold.

In the present disclosure, a method for operating a mobile electronic device through a wearable electronic device is provided. In one of the exemplary embodiments, the method includes at least, but not limited to, detecting a first motion data representing a movement of the wearable electronic device, and transmitting the first motion data through a transceiver of the wearable electronic device, wherein a difference between the first motion data and the second motion data is calculated. Then, an operation of the mobile electronic device is executed when the difference between the first motion data and the second motion data is within a predetermined range, wherein the first motion data and the second motion data are measured during a same period.

In the present disclosure, a wearable electronic device is provided. The wearable electronic device would include at least, but not limited to, a transceiver, a motion sensor, and a processor. The motion sensor is configured for detecting a first motion data representing a movement of the wearable electronic device. In addition, the processor is configured for obtaining the first motion data from the motion sensor and transmitting the first motion data through the transceiver, wherein a difference between the first motion data and the second motion data is calculated. Then, an operation is executed when the difference between the first motion data and the second motion data is within a predetermined threshold, and wherein the first motion data and the second motion data are measured during a same period.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
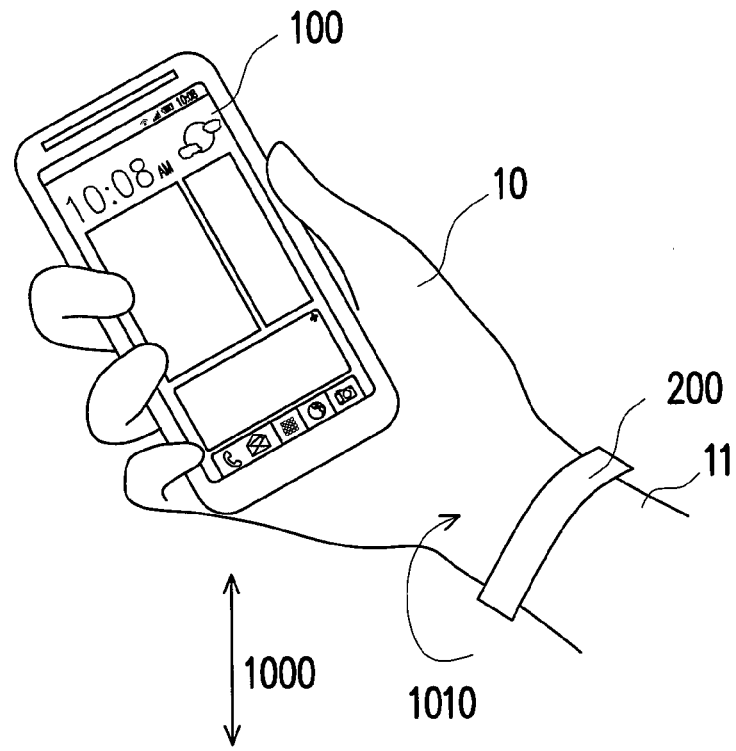
FIG. 1 is a conceptual diagram illustrating the motion coherence between a mobile electronic device and a wearable electronic device according to one of the exemplary embodiment of the disclosure.

To make the above features and advantages of the application more comprehensible, several embodiments accompanied with drawings are described in detail as follows.

DETAILED DESCRIPTION OF DISCLOSED EMBODIMENTS

Reference will now be made in detail to the present embodiments of the disclosure, examples of which are illustrated in the accompanying drawings. Wherever possible, the same reference numbers are used in the drawings and the description to refer to the same or like parts.

In the exemplary embodiments of the disclosure, the wearable electronic device could refer to an electronic device being worn by an individual. For example, the wearable electronic device could be worn around a finger of the individual or fastened around a wrist of the individual. Although, the wearable electronic device illustrated in various exemplary embodiments hereafter are geared toward a wrist-band type, the same various exemplary embodiments may also implement the wearable electronic device in a ring-type electronic device designed to worn on a finger of an individual. It should be noted that the disclosure is not intended to limit the disposition or shape of the wearable electronic device.

To identify an individual and ensure that an individual is authorized to operate a mobile electronic device, the disclosure provides security to verify an identity of the individual and yet reducing the steps the individual would take for operating the mobile electronic device. In the disclosure, a biometric signature of the user would be obtained to identify an individual who wears a wearable electronic device. When the biometric signature obtained on the writable electronic device is consistent with a stored biometric signature, the individual corresponding to the biometric signature would be authorized to operate the mobile electronic device based on motion coherence between the mobile electronic device and the wearable electronic device without providing an input. Operations of the mobile electronic device may be performed, automatically, based on the motion coherence between the mobile electronic device and the wearable electronic device.

FIG. 1 is a conceptual diagram illustrating the motion coherence between a mobile electronic device 100 and a wearable electronic device 200 according to one of the exemplary embodiments of the disclosure. With reference to FIG. 1, the disclosure includes a mobile electronic device 100 and a wearable electronic device 200. In the exemplary embodiment, the wearable electronic device 200 is disposed on a wrist 11 of an individual while the individual is holding the mobile electronic device 100 with a hand 10 corresponding to a same limb as the wrist 11 wearing the wearable electronic device 200. When the user moves his hand 10, a movement would be detected by the mobile electronic device 100 and the wearable electronic device 200, respectively. In response to the movement, the mobile electronic device 100 and the wearable electronic device 200 would each detect a motion data corresponding to the movement. Then, the motion data obtained from both the mobile electronic device 100 and the writable electronic device 200 may be analyzed (or processed) to determine that whether the motions of the mobile electronic device 100 and the wearable electronic device 200 are coherence (i.e., the motion coherence). The disclosure would be explained in detail accompanying with various exemplary embodiments in the following.

Figure 2:
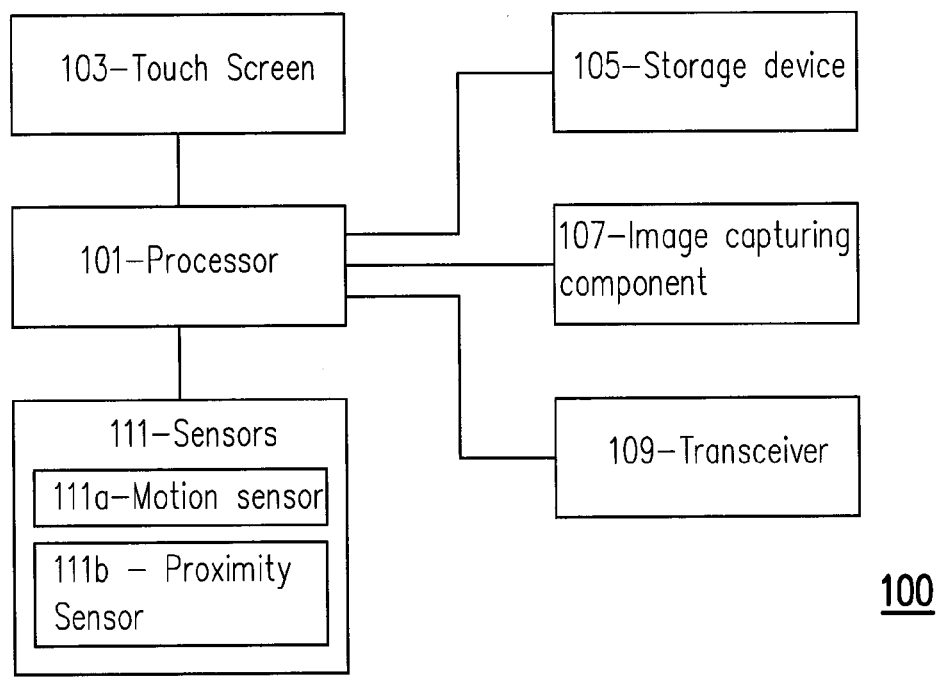
FIG. 2 is a block diagram illustrating hardware of a mobile electronic device in term of functional blocks according to one of the exemplary embodiments of the disclosure.

FIG. 2 is a block diagram illustrating hardware of a mobile electronic device 100 in term of functional blocks according to one of the exemplary embodiments of the disclosure.

With reference to FIG. 2, the mobile electronic device 100 may be a smart phone, a mobile phone, a tablet computer, a personal digital assistant (PDA) and so forth. In the exemplary embodiment, the mobile electronic device 100 would include at least, but not limited to, a processor 101, a touch screen 103, a storage device 105, an image capturing device 107, a transceiver 109, and a plurality of sensors 111. Each components of the mobile electronic device 100 would be explained in details below.

The processor 110 may be, but not limited to, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. In the present embodiment, the processor 101 may be electrically coupled to the touch screen 103, the storage medium 105, the image capturing device 107, the transceiver 109, and each of the sensors 111, respectively, where the processor 101 would control all of the operations of the exemplary electronic device 100.

The touch screen 103 may be a display device integrated with touch detecting components, which could simultaneously provide a display function and an input function within a display area of the mobile electronic device 100. The display device may be, but not limited to, a liquid crystal display (LCD), a light-emitting diode (LED), a field emission display (FED), or other displays. The touch detecting components are disposed in the display device and arranged in rows and columns, which are configured to detect a touch event. The touch event may include events generated by touching the touch screen 103 with a finger, a palm, body parts or other objects. The touch detecting components may be, but not limited to, a resistive, a capacitive an optical or other types of touch sensing devices which would be integrated as a part of the touch screen 103.

The storage medium 105 may be volatile or nonvolatile memory storing buffered or permanent data such as data corresponding to a movement of the mobile electronic device, a biometric signature, media content such as image or instructions (programs) used to execute operations of the mobile electronic device 100.

The image capturing device 107 may be, but not limited to, a camera, video camera, or the likes which captures scenes through an optical component and an image pickup component as images such as photo, video, and the likes.

The transceiver 109 may be components such as a protocol unit which supports signal transmissions of a global system for mobile communication (GSM), a personal handy-phone system (PHS), a code division multiple access (CDMA) system, a wideband code division multiple access (WCDMA) system, a long term evolution (LTE) system, or a worldwide interoperability for microwave access (WiMAX) system. The transceiver 109 may also be components which support signal transmissions of a wireless fidelity (Wi-Fi) system, or Bluetooth (BT). The transceiver 190 would provide wireless transmission for the mobile electronic device 100 including components, but not limited to, a transmitter circuit, a receiver circuit, an analog-to-digital (A/D) converter, a digital-to-analog (D/A) converter, a low noise amplifier (LNA), Mixers, filters, matching networks, transmission lines, a power amplifier (PA), and one or more antenna units. The transmitter and the receiver transmit downlink signals and receive uplink signals wirelessly. The receiver may include functional elements to perform operations such as low noise amplifying, impedance matching, frequency mixing, up frequency conversion, filtering, power amplifying, and so forth. The analog-to-digital (A/D) or the digital-to-analog (D/A) converter is configured to convert from an analog signal format to a digital signal form during uplink signal processing and from a digital signal format to an analog signal format during downlink signal processing. In the exemplary embodiment of the disclosure, the transceiver 109 may be utilized to wirelessly transmit or receive the data to or from other electronic devices.

The plurality of sensors 111 may include, but not limited to, a motion sensor 111a and a proximity sensor 111b. In the exemplary embodiment, with reference to FIGS. 1 and 2, the motion sensor 111a is configured to detect a linear movement 1000 of the mobile electronic device 100 moving in a direction. The motion sensor 111a would output a motion data representing the linear movement and the direction corresponding to the movement. It should be noted that the linear movement 1000 in FIG. 1 is presented for illustration purpose. The exemplary embodiment is not intended to limit the direction of the movement. In the exemplary embodiment, the motion sensor may be implemented by, but not limited to, a g-sensor such as an accelerometer or a gyroscope sensor (i.e., a gyro-sensor). For example, a three axis accelerometer would output an acceleration corresponding to an axis in response to the movement of the mobile electronic device, so that the linear movement of the mobile electronic device 100 may be obtained.

In one of the exemplary embodiments of the disclosure, with reference to FIGS. 1 and 2, the motion sensor 111a is further configured to sense a rotational movement 1010 in space (e.g., pitch, roll, and yaw), which may be implemented by, but not limited to, a g-sensor in conjunction with an electric compass, or a gyroscope. It should be noted that the rotational movement 1010 illustrated in FIG. 1 is presented for illustration purpose, and the exemplary embodiment is not intended to limit the direction or the type of the rotational movement. The motion sensor 111a would detect a rotational movement of the mobile electronic device 100 rotating about a particular axis in space and output a rotational motion data representing the rotational movement (e.g, rotational angular velocity or rotational angle). It should be noted that the exemplary embodiments are not intended to limit the implementation of the motion sensor 111a. The motion sensor 111a may be implemented by any sensors or combinations of sensors that detects the liner movement, the direction of the linear movement, or the rotational movement of the mobile electronic device 100.

The proximity sensor 111b of the mobile electronic device 100 is configured to sense a presence of a nearby object or approaching of the nearby object without contact. The type of the proximity sensor 111b may include, but not limited to, inductive, capacitive, photoelectric, microwave sensors, etc. In the exemplary embodiment, the proximity sensor 111b is configured to sense the presence of the object and then output a signal in response to the presence of the object.

Figure 3:
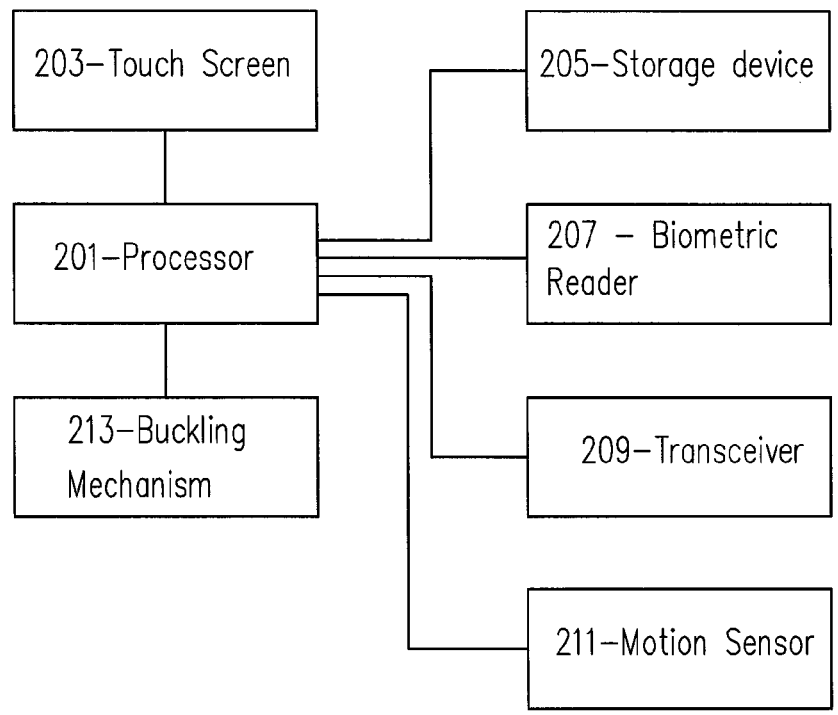
FIG. 3 is a block diagram illustrating hardware of a wearable electronic device in term of functional blocks according to one of the exemplary embodiment of the disclosure.

FIG. 3 is a block diagram illustrating hardware of a wearable electronic device 200 in term of functional blocks according to one of the exemplary embodiments of the disclosure.

With reference to FIG. 3, the wearable electronic device 200 may be a wrist-band type electronic device which could be worn around an individual's wrist. In the exemplary embodiment, the wearable electronic device 200 would include at least, but not limited to, a processor 201, a touch screen 203, a storage device 205, a biometric reader 207, a transceiver 209, a motion sensor 211, and a buckling mechanism 213. Each components of the wearable electronic device 200 would be explained in details below.

The processor 201 may be, but not limited to, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. In the present embodiment, the processor 201 may be electrically coupled to the touch screen 203, the storage medium 205, the biometric reader 207 and the transceiver 209, respectively, where the processor 201 would control all of the operations of the wearable electronic device 200.

The touch screen 203 may be a display device integrated with touch detecting components, which could simultaneously provide a display function and an input function within a display area of the wearable electronic device 200. The display device may be, but not limited to, a liquid crystal display (LCD), a light-emitting diode (LED), a field emission display (FED), or other displays. The touch detecting components are disposed in the display device and arranged in rows and columns, which are configured to detect a touch event. The touch event may include events generated by touching the touch screen 203 with a finger, a palm, body parts or other objects. The touch detecting components may be, but not limited to, a resistive, a capacitive, a photoelectric or other types of touch sensing devices which would be integrated as a part of the touch screen 203.

The storage medium 205 may be volatile or nonvolatile memory storing buffered or permanent data such as data corresponding to a movement of the wearable electronic device, a biometric signature, or instructions used to execute operations of the wearable electronic device 200.

The biometric reader 207 may be, but not limited to, an electrocardiography (ECG) detector, a finger print scanner, etc. The biometric reader 207 is configured to obtain a biometric signature that is unique to an individual. In the exemplary embodiment, the ECG detector is utilized for detecting a characteristic of heartbeat of an individual who wears the wearable electronic device 200. However, the disclosure is not limited thereto. In other exemplary embodiments of the disclosure, the biometric signature may be a finger print of the individual, a characteristic of the individual's voice, and the likes. The ECG detector of the exemplary embodiment would be explained in detail later.

The transceiver 209 may be components such as a protocol unit which supports signal transmissions of a wireless fidelity (Wi-Fi) system, Bluetooth (BT), or near field communication (NFC). The transceiver 209 would provide wireless transmission for the wearable electronic device 200 including components, but not limited to, a transmitter circuit, a receiver circuit, an analog-to-digital (A/D) converter, a digital-to-analog (D/A) converter, a low noise amplifier (LNA), Mixers, filters, matching networks, transmission lines, a power amplifier (PA), and one or more antenna units. The transmitter and the receiver transmit downlink signals and receive uplink signals wirelessly. The receiver may include functional elements to perform operations such as low noise amplifying, impedance matching, frequency mixing, up frequency conversion, filtering, power amplifying, and so forth. The analog-to-digital (A/D) or the digital-to-analog (D/A) converter is configured to convert from an analog signal format to a digital signal form during uplink signal processing and from a digital signal format to an analog signal format during downlink signal processing. In the exemplary embodiment of the disclosure, the transceiver 209 may be utilized to wirelessly transmit or receive the data to or from other electronic devices.

The motion sensor 211 would include, but not limited to, a g-sensor such as an accelerometer or a gyroscope sensor (or a gyro-sensor). In the exemplary embodiment, with reference to FIGS. 1 and 3, the motion sensor 211 is configured to detect a linear movement 1000 of the wearable electronic device 200 moving in a direction. The exemplary embodiment illustrated in FIG. 1 is not intended to limit the direction of the linear movement 1000 which is presented for illustration purpose. The motion sensor 211 would output a motion data representing the linear movement of the wearable electronic device 200 and the direction corresponding to the movement. For example, a three axis accelerometer would output an acceleration corresponding to an axis in response to the movement of the wearable electronic device 200, so that the linear movement of the wearable electronic device 200 may be obtained.

In one of the exemplary embodiments of the disclosure, with reference to FIGS. 1 and 3, the motion sensor 211 is further configured to sense a rotational movement 1010 in space (e.g., pitch, roll, and yaw), which may be implemented by, but not limited to, a g-sensor in conjunction with an electric compass, or a gyroscope. The exemplary embodiment illustrated in FIG. 1 is not intended to limit the direction or type of the rotational movement 1010 which is presented for illustration purpose. The motion sensor would detect a rotational movement of the wearable electronic device 200 rotating about a particular axis in space and output a rotational motion data representing the rotational movement (e.g., rotational angular velocity or angle). It should be noted that the exemplary embodiments are not intended to limit the implementation of the motion sensor 211 of the wearable electronic device 200. The motion sensor 211 may be implemented by any sensors or combinations of sensors that detects the liner movement, the direction of the linear movement or the rotational movement of the wearable electronic device 200.

The buckling mechanism 213 may be configured to buckle one end of the wearable electronic device 200 to another end of the wearable electronic device 200 so that the wearable electronic device 200 is fastened around individual's wrist. In one of the exemplary embodiments, the buckling mechanism 213 may include, but not limited to, a microUSB connector which is configured to detect whether two ends of the wearable electronic device 200 are buckled together. It should be noted that the exemplary embodiment is not intended to limit the type of the connector for implementing the buckling mechanism 213. In one of exemplary embodiments, sensory devices (e.g., a proximity sensor) may be utilized to detect whether two ends of the wearable electronic device 200 are buckled together.

In addition to the microUSB connector, the buckling mechanism 213 also includes a mechanical mean (not shown) to buckle both ends of the wearable electronic device 200 in a mechanical fashion, so that the wearable electronic device 200 would be securely fastened around the individual's wrist. The disclosure is not intended to limit the mechanical mean of the buckling mechanism 213, the mechanical mean may be implemented by any means that securely buckles both ends of the wearable electronic device 200 together.

When two ends of the wearable electronic device 200 are not buckled together, such as when the user takes off the wearable electronic device 200 from the wrist, the buckling mechanism 213 is considered to be open. The microUSB connector may be configured to connect to a personal electronic device (e.g., a computer, a laptop, etc.) for data transmission or power charge when the buckling mechanism 213 is open. On the other hand, when the buckling mechanism 213 is buckled and securely fastened around the user's wrist, the wearable electronic device 200 may obtain a biometric signature that is unique to the individual who wears the wearable electronic device 200 as a security check through the biometric reader 205 of the wearable electronic device 200.

Figure 4:
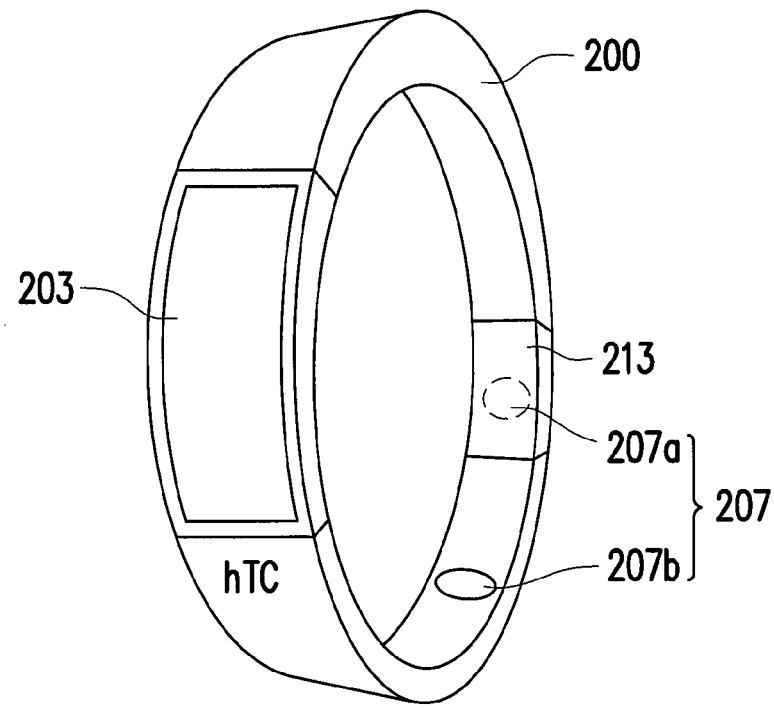
FIG. 4 is a conceptual diagram illustrating the wearable electronic device 200 according to one of the exemplary embodiments of the disclosure.

FIG. 4 is a conceptual diagram illustrating the wearable electronic device 200 according to one of the exemplary embodiments of the disclosure. In the exemplary embodiment illustrated in FIG. 4, the biometric reader 207 is an ECG detector having a first ECG electrode 207a and a second ECG electrode 207b, which are respectively disposed on two opposite surfaces of the wearable electronic device 200. The first ECG electrode 207a is disposed on an outer surface of the wearable electronic device 200, which faces toward a direction away from the center of the wearable electronic device 200, and the second ECG electrodes 207b is disposed on an inner surface of the wearable electronic device 200, which faces toward the center of the writable electronic device 200. The first ECG electrodes 207a and the second ECG electrodes 207b of the ECG detector are configured to detect electrical impulses generated by cardiac activities of a heart of an individual who wears the wearable electronic device 200 and translate into an ECG data.

Figure 5:
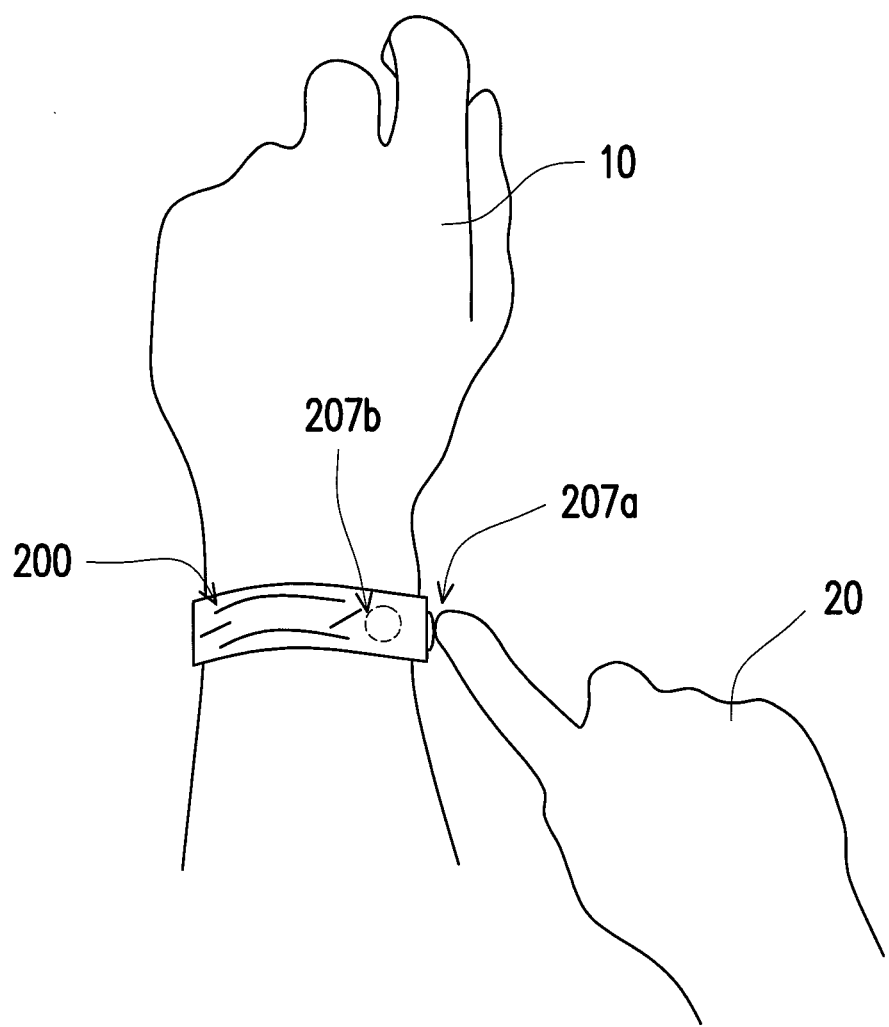
FIG. 5 is a conceptual diagram illustrating the acquisition of a biometric signature through the ECG detector when the writable electronic device 200 is fastened on individual's wrist according to one of the exemplary embodiments of the disclosure.

FIG. 5 is a conceptual diagram illustrating the acquisition of a biometric signature through the ECG detector when the writable electronic device 200 is fastened to individual's wrist according to one of the exemplary embodiments of the disclosure. It should be noted that an ECG of an individual would be measured through an electrical path passing through the heart of the individual, so as to obtain the characteristics of the heart. Therefore, in one of the exemplary embodiment, the electrical activity of the heart would be measured through a path between two hands of the individual. In the exemplary embodiment, the second ECG electrode 207b disposed on the inner surface of the wearable electronic device 200 would contact a skin area of the wrist 11 of the individual when the wearable electronic device 200 is fastened on the wrist 11 of the individual. Then, the individual would touch the first ECG electrode 207a disposed on the outer surface of the wearable electronic device 200 with a finger of a right hand 20 of the individual to complete the path for measuring the electrical activity of the heart.

It should be noted that the disposition of the ECG detector is not limited to the exemplary embodiment illustrated in FIG. 4. In one of the exemplary embodiments, the first ECG electrodes 207a and the second ECG electrodes 207b may be disposed on two opposite surfaces of the buckling mechanism 213 of the wearable electronic device 200. For example, the first ECG electrodes 207a may be disposed on the outer surface of the buckling mechanism 213, and the second ECG electrodes 207b of the ECG detector may be disposed on the inner surface of the buckling mechanism 213. In the exemplary embodiment, a biometric signature may be obtained while the wearing of the wearable electronic device 200 as the individual fastens the buckling mechanism 213.

In the following, the connection between the mobile electronic device 100 and the wearable electronic device 200 is described.

In one of the exemplary embodiments of the disclosure, the mobile electronic device 100 would be wirelessly connected to the wearable electronic device 200 through the Bluetooth protocol. In other words, the mobile electronic device 100 would be paired with the wearable electronic device 200 with the Bluetooth protocol, and information may be exchanged between the mobile electronic device 100 and the wearable electronic device 200.

The wearable electronic device 200 provides an authentication process which would identify an individual who wears the wearable electronic device 200 in a biological level for operating the mobile electronic device 100. In detail, upon buckling the buckling mechanism 213, the processor 201 of the wearable electronic device 200 would request the authentication process for identifying the individual who wears the writable electronic device 200. The wearable electronic device 200 may prompt the individual to provide a biometric signature through the biometric reader 205 of the wearable electronic device 200. In the exemplary embodiment, the biometric reader 205 would measure ECG data representing electrical activity of a heart of the individual as the biometric signature unique to the individual. Next, the processor 201 of the wearable electronic device 200 would determine whether the measured biometric signature matches a stored biometric signature stored in the storage device 203 of the wearable electronic device 200.

After the identity of the individual is verified, the wearable electronic device 200 would be configured as a security key (e.g., a hardware passkey such as a dongle) for operating the mobile electronic device 100 through the BT pairing connection. However, when the buckling mechanism 213 is unbuckled which refers to when the microUSB connector of the buckling mechanism 213 is disconnected, the authentication process would be performed upon reconnection of the microUSB connector to identify the individual who wears the wearable electronic device 200.

In one of the exemplary embodiments of the disclosure, the wearable electronic device 200 would disable all of the functions except a clock function, if an individual who wears the wearable electronic device 200 does not pass the authentication process.

Figure 6A:
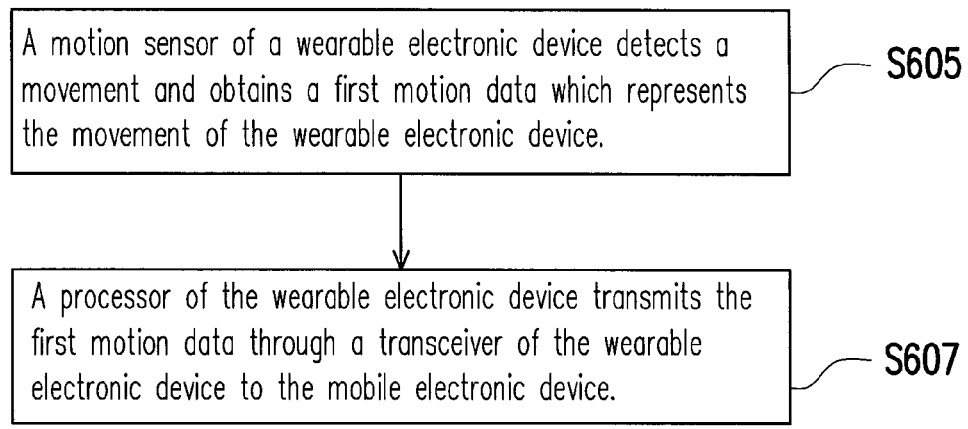
FIGS. 6A and 6B are flow diagrams illustrating a method for operating of the mobile electronic device 100 illustrated in FIG. 2 in conjunction with the wearable electronic device 200 illustrated in FIG. 3 according to one of the exemplary embodiments of the disclosure.
Figure 6B:
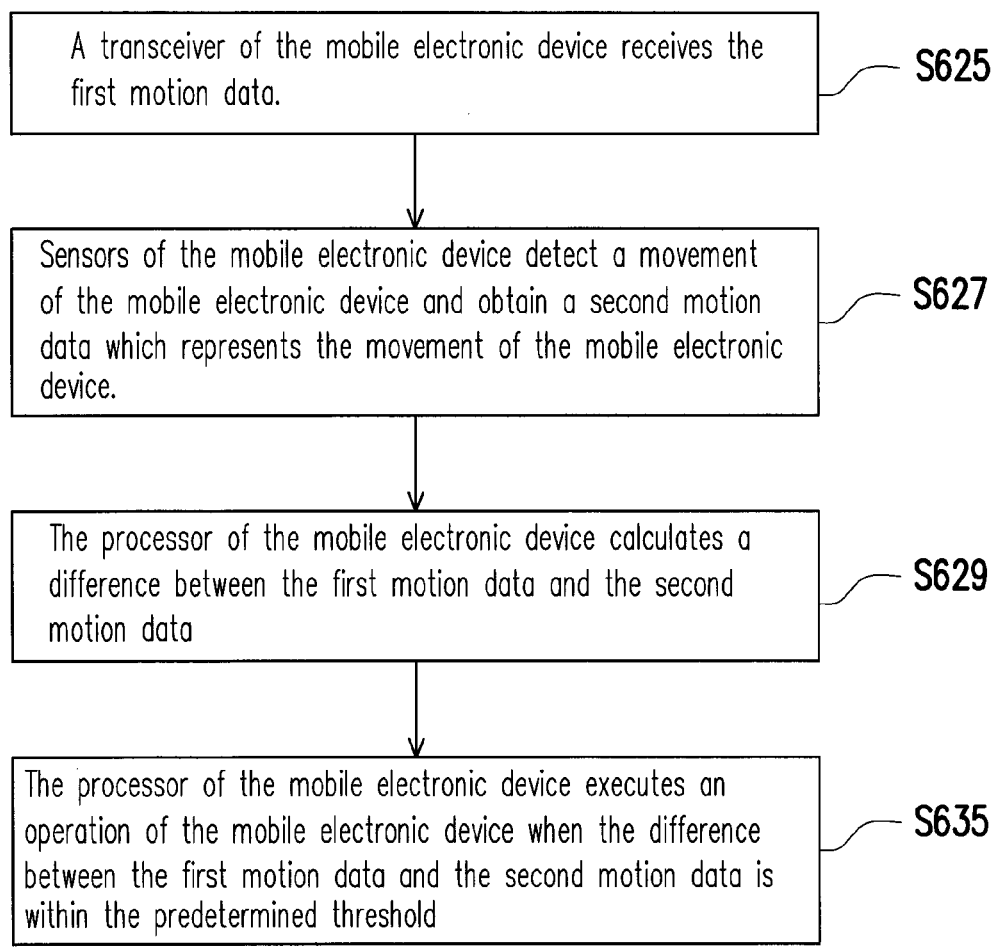

FIGS. 6A and 6B are flow diagrams illustrating a method for operating of the mobile electronic device 100 illustrated in FIG. 2 in conjunction with the wearable electronic device 200 illustrated in FIG. 3 according to one of the exemplary embodiments of the disclosure. In the exemplary embodiment, with reference to FIG. 1, an individual may pick up the mobile electronic device 100 with a hand 10 which corresponds to a same limb as a wrist (or an arm) 11 wearing the wearable electronic device 200. Furthermore, the mobile electronic device 100 is wirelessly connected to the wearable electronic device 200 through the Bluetooth.

With reference to FIG. 6A, in step S605, the motion sensor 211 of the wearable electronic device 200 would detect a movement of the wearable electronic device 200 and obtain a first motion data which represents the movement of the wearable electronic device 200. For example, the motion sensor 211 of the wearable electronic device 200 may be an accelerometer, which would detect acceleration toward a particular direction (e.g., a linear movement 1000 illustrated in FIG. 1) in response to the motion of the wearable electronic device 200.

In step S607, the processor 201 of the wearable electronic device 200 would obtain the first motion data from the motion sensor 211 of the wearable electronic device 200 and transmit the first motion data through the transceiver 209 of the wearable electronic device 200.

In the exemplary embodiment, the mobile electronic device 100 is picked up by the hand 10 corresponding to the same limb as the arm 11 wearing the wearable electronic device 200. Therefore, the mobile electronic device 100 in motion would also detect a movement similar to the wearable electronic device 200. Since the mobile electronic device 100 and the wearable electronic device 200 are disposed on the hand 10 and arm 11 of the same limb of the individual, the movements of the mobile electronic device 100 and the wearable electronic device 200 would be similar. In other words, the movement of the mobile electronic device 100 would coherent with the movement of the wearable electronic device 200, which would be referred to as motion coherence later. With reference to FIG. 6B, in step S625, the transceiver 109 of the mobile electronic device 100 would receive the first motion data. For example, the mobile electronic device 100 would receive the first motion data from the wearable electronic device 200. The first motion data would include the acceleration toward a particular direction which represents the motion of the wearable electronic device 200.

In step 627, the motion sensor 111a of the sensors 111 of the mobile electronic device 100 would detect a movement of the mobile electronic device 100 and obtain a second motion data which represents the movement of the mobile electronic device 100. For example, the motion sensor 111a of the mobile electronic device 100 may be implemented by an accelerometer. So, the motion sensor 111a would detect an acceleration toward a particular direction in response to the motion of the mobile electronic device 100. It should be noted that the first motion data and the second motion data are measured within a same period of time.

In step S629, the processor 101 of the mobile electronic device 100 would compare the first motion data and the second motion data by calculating a difference between the first motion data and the second motion data. In other words, the motion coherence between the mobile electronic device 100 and the wearable electronic device 200 may be determined by comparing the first motion data and the second motion data. If the difference between the first motion data and the second motion data is within a predetermined threshold, the motion of the mobile electronic device 100 and the motion the wearable electronic device 200 would be determined to be coherent. In the exemplary embodiment, the predetermined threshold may refer to an acceptable tolerance for the difference between the first motion data and the second motion data.

In step S635, the processor 101 of the mobile electronic device 100 would execute an operation of the mobile electronic device 100 when the difference between the first motion data and the second motion data is within the predetermined threshold. For example, auto-unlock of the mobile electronic device 100 would be executed in response to the motion coherence between the motion of the mobile electronic device 100 and the wearable electronic device 200.

In one of the exemplary embodiments of the disclosure, the motion sensor 211 of the wearable electronic device 200 would further detect a first rotational angle representing a rotational angle of the wearable electronic device 200 about an axis. For example, a rotational movement 1010 illustrated in FIG. 1. Similarly, the motion sensor 111a of the mobile electronic device 100 would further detect a second rotational angle representing a rotational angle of the mobile electronic device 100 about an axis. Therefore, the processor 101 of the mobile electronic device 100 would further calculate an angular difference between the first rotational angle and the second rotational angle to determine whether the mobile electronic device 100 and the wearable electronic device 200 have similar rotational angle. In other words, in one of the exemplary embodiments of the disclosure, the disclosure would take an additional step to determine the motion coherence between the mobile electronic device 100 and the wearable electronic device 200 according to the rotational angles.

In the following, various embodiments are illustrated to elaborate the wearable electronic device 200 acting as a security key for operating the mobile electronic device 100.

Figure 7A:
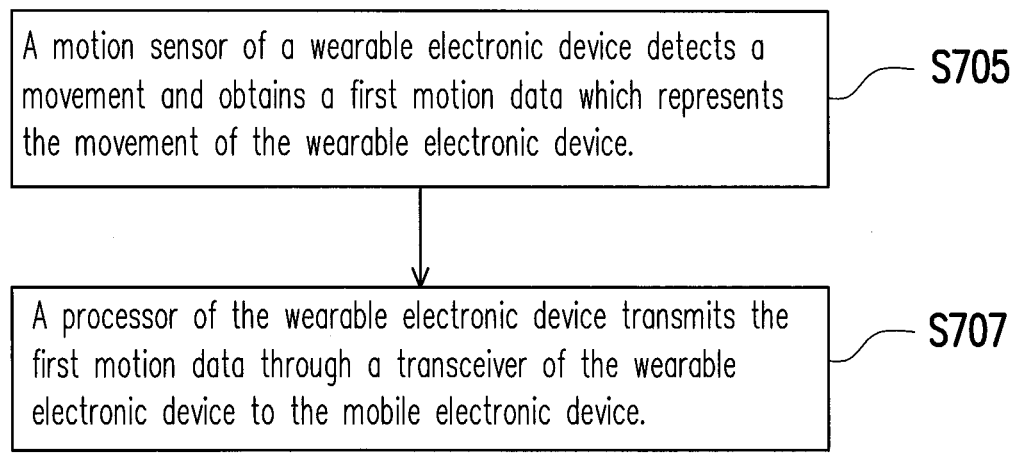
FIGS. 7A and 7B are flow diagrams illustrating a method of auto-unlocking the mobile electronic device by utilizing the wearable electronic device 200 as a security key according to one of the exemplary embodiments of the disclosure.
Figure 7B:
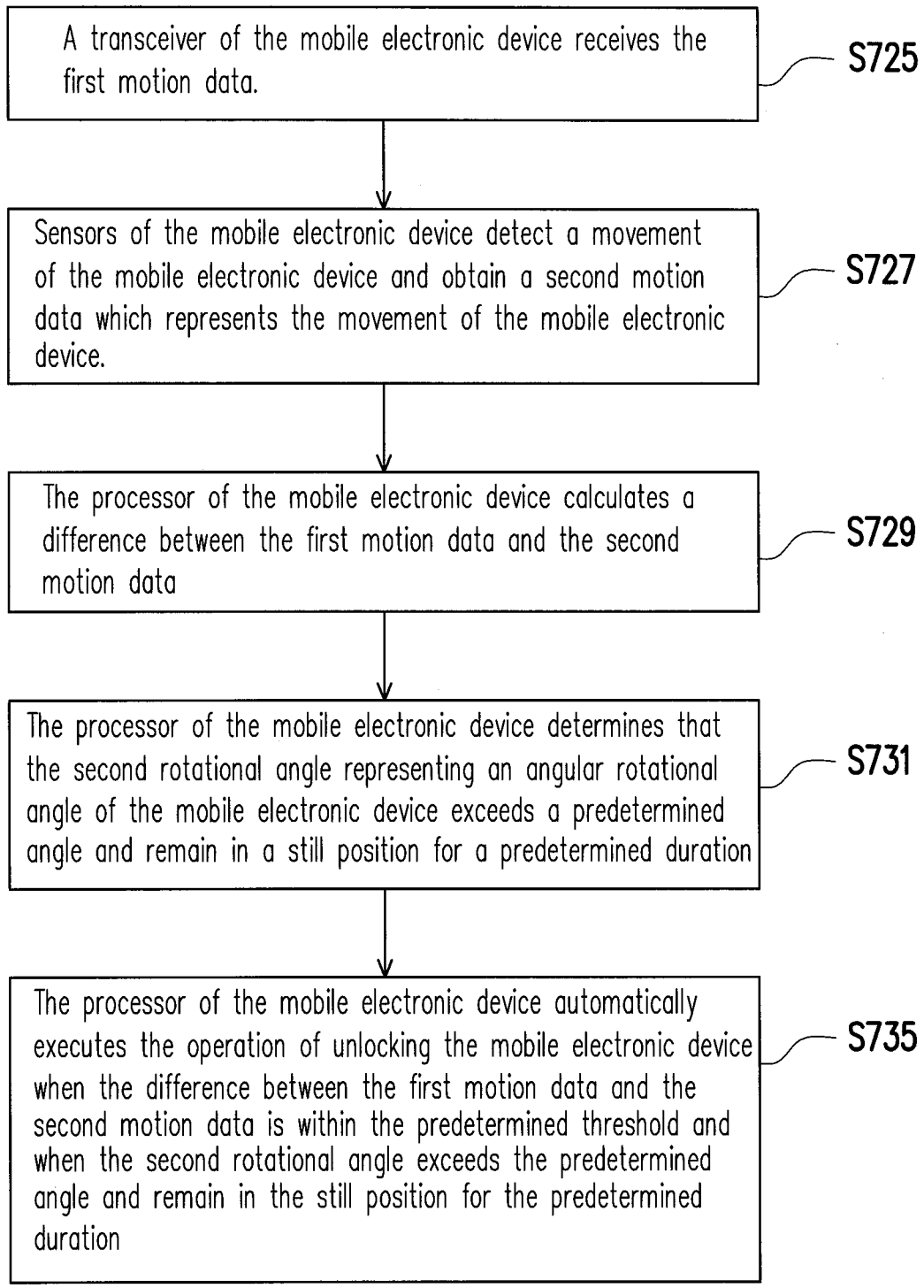

FIGS. 7A and 7B are flow diagrams illustrating a method of auto-unlocking the mobile electronic device 100 by utilizing the wearable electronic device 200 as a security key according to one of the exemplary embodiments of the disclosure. Conventionally, in order to unlock a mobile electronic device, an individual would have to manipulate the mobile electronic device such as pressing a physical button, tapping on a touch screen, applying a sliding operation on the touch screen, inserting a password, and so on. In the present exemplary embodiment, an individual would unlock the mobile electronic device 100 by simply picking up the mobile electronic device 100 with a hand corresponding to a same limb as an arm wearing a wearable electronic device 200. This is also referred to as a one hand operation in the disclosure.

In the exemplary embodiment illustrated in FIGS. 7A and 7B, the mobile electronic device 100 may be in a lock mode for security or power saving reasons and placed on a table, in a packet, in a bag, etc. Similar to the exemplary embodiment illustrated in FIGS. 6A and 6B, the mobile electronic device 100 and the wearable electronic device 200 would obtain the first motion data and the second motion data, respectively, to determine whether a movement of mobile electronic device 100 and a movement of the wearable electronic device 200 are consistent to each other by determining whether a difference between the first motion data and the second motion data are within an acceptable threshold (i.e., the predetermined threshold). In the exemplary embodiment, steps S705-S707 and S725-S729 are similar to the steps of S605-S607 and S625-S629, and thus the detail description is omitted.

In the exemplary embodiment illustrated in FIGS. 7A and 7B, in step S731, the mobile electronic device 100 would further determine whether a second rotational angle of the mobile electronic device 100 would exceeds a predetermined angle and remain in a still position for a predetermined duration. In the exemplary embodiment, the mobile electronic device 100 may be determined to be in the still position when the second rotational angle does not exceeds the predetermined angle for the predetermined duration. For example, the predetermined angle may be any angle above 10 degrees, and the predetermined duration may be 0.5 to 2 seconds. However, the disclosure is not limited thereto, these predetermined variables may be designed according to design requirements. In the example, when the mobile electronic device 100 is picked up, a linear motion is generated as the individual brings the mobile electronic device 100 toward the individual to operate the mobile electronic device 100. At the same time, the individual would also rotate the mobile electronic device 100 as to turn the touch screen 103 of the mobile electronic device 100 toward the individual. The motion sensor 111a of the mobile electronic device 100 would also detect the second rotational angle to determine whether the individual has rotated the mobile electronic device 100 for more than 10 degrees. After the second rotational angle exceeds the predetermined angle, the processor 101 would further determine whether the mobile electronic device 100 remains in the still position by determining whether the second rotational angle exceeds the predetermined angle during a predetermined duration. That is, the mobile electronic device 100 is moved to a reading level, so that the second rotational angle would not be changed for more the predetermined angle (e.g., 10 degrees) within the predetermined duration (e.g., 1 second). Afterward, an operation of the mobile electronic device 100 would be executed. That is, in step S735, the processor 101 of the mobile electronic device 100 would automatically execute the operation of unlocking the mobile electronic device 100 when the difference between the first motion data and the second motion data is within the predetermined threshold and when the second rotational angle exceeds the predetermined angle and remain in the still position for the predetermined duration.

In one of the exemplary embodiments, the image capturing device 105 of the mobile electronic device 100 is utilized. The image capturing device 105 may be utilized to capture scenes surrounding the mobile electronic device 100. In the exemplary embodiment, the image capturing device 105 would be disposed on the same side as the touch screen 103 of the mobile electronic device 100. Therefore, the image capturing device 105 may be utilized to capture an image representing an individual's face and determine that the mobile electronic device 100 is been rotated to a position for the individual to read information displayed on the touch screen 101 of the mobile electronic device 100. So, the execution of the operation for unlocking the mobile electronic device 100 would further dependent upon the contents captured by the image capturing device 105 in accordance to the exemplary embodiment. For example, the processor 101 of the mobile electronic device 100 may determine whether or not an object (e.g., individual's face) stays within an area for a predetermined duration, wherein the predetermined duration is configurable to meet a design requirement.

In yet another the exemplary embodiment, the image capturing device 105 of the mobile electronic device 100 is utilized as an additional step for identifying the individual who currently operates the mobile electronic device as a security measure. After comparison of the first motion data and the second motion data, the mobile electronic device 100 may further perform a facial recognition to provide an extra layer of security to verify the individual before the operation of the mobile electronic device 100.

Figure 8A:
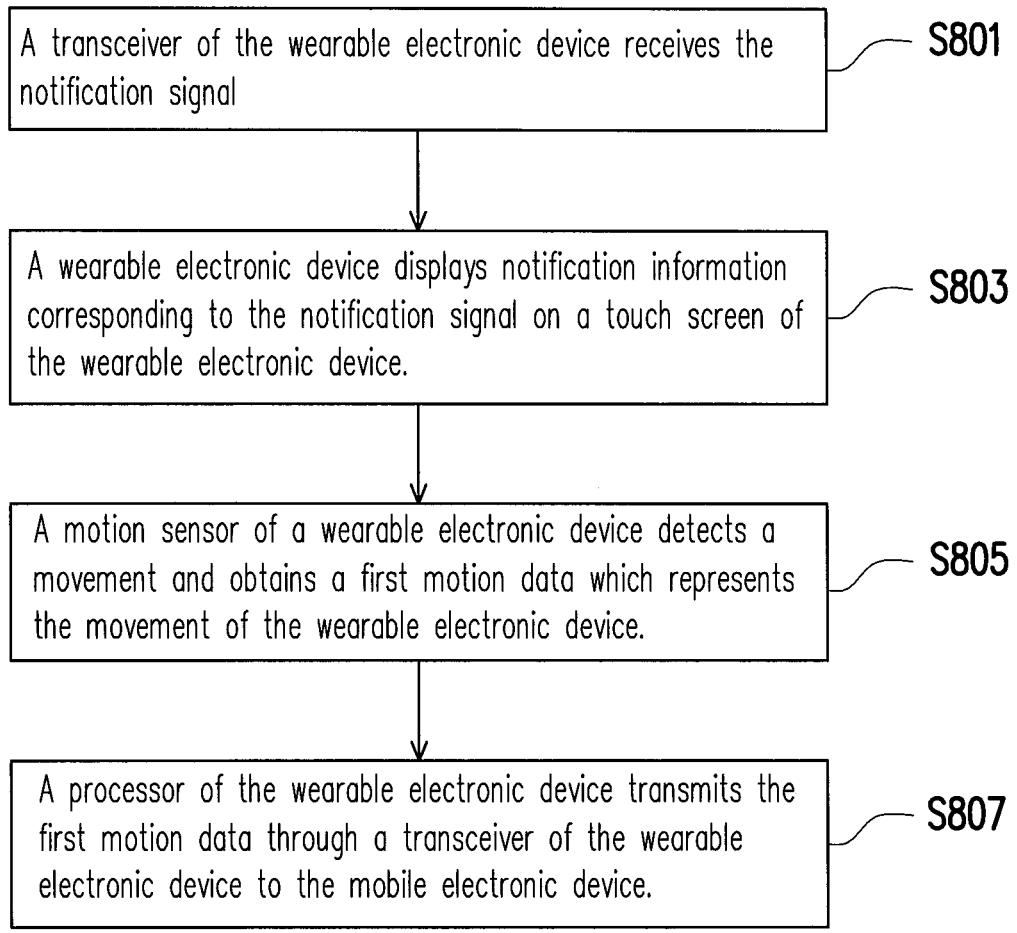
FIGS. 8A and 8B are flow diagrams illustrating a method of operating the mobile electronic device in response to an incoming event according to one of the exemplary embodiments of the disclosure.
Figure 8B:
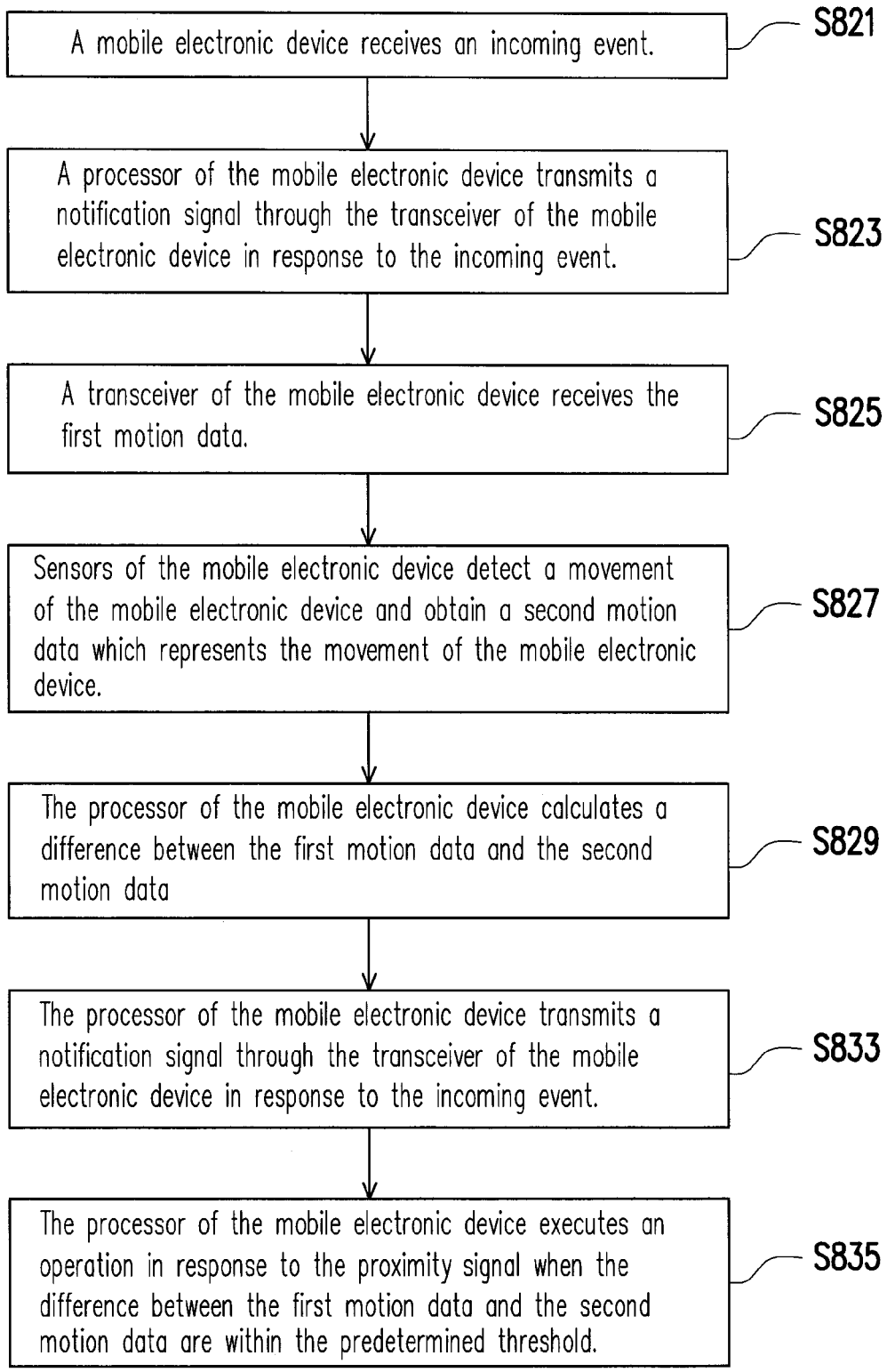

In one of the exemplary embodiments of the disclosure, an individual who wears the wearable electronic device 200 would be able to response to an incoming event received by the mobile electronic device 200. FIGS. 8A and 8B are flow diagrams illustrating a method of operating the mobile electronic device 100 in response to an incoming event according to one of the exemplary embodiment of the disclosure. With reference to FIG. 8B, in step S821, the mobile electronic device 100 would receive an incoming event such as an incoming phone call, an incoming message, an calendar event or any other notification that prompts the individual for an input. For illustration purpose, the incoming event would be an incoming phone call. In step S823, the processor 101 of the mobile electronic device 100 would transmit a notification signal through the transceiver 109 of the mobile electronic device 100 to the wearable electronic device 200 in response to the incoming event.

As mentioned above, the mobile electronic device 100 and the wearable electronic device 200 are paired through Bluetooth protocol, and information may be exchanged between them. With reference to FIG. 8A, in step S801, the transceiver 209 of the wearable electronic device 200 would receive the notification signal corresponding to the incoming event from the mobile electronic device 100. Then, in step S803, the wearable electronic device 200 would display notification information corresponding to the notification signal on the touch screen 203 of the wearable electronic device 200 to notify the individual who wears the wearable electronic device 200 of the incoming event. In the exemplary embodiment, the incoming event could be an incoming phone call received from a radio communication network of a cellular tower. The wearable electronic device 200 would display caller information corresponding to the incoming call on the touch screen 203 of the wearable electronic device 200.

Figure 9:
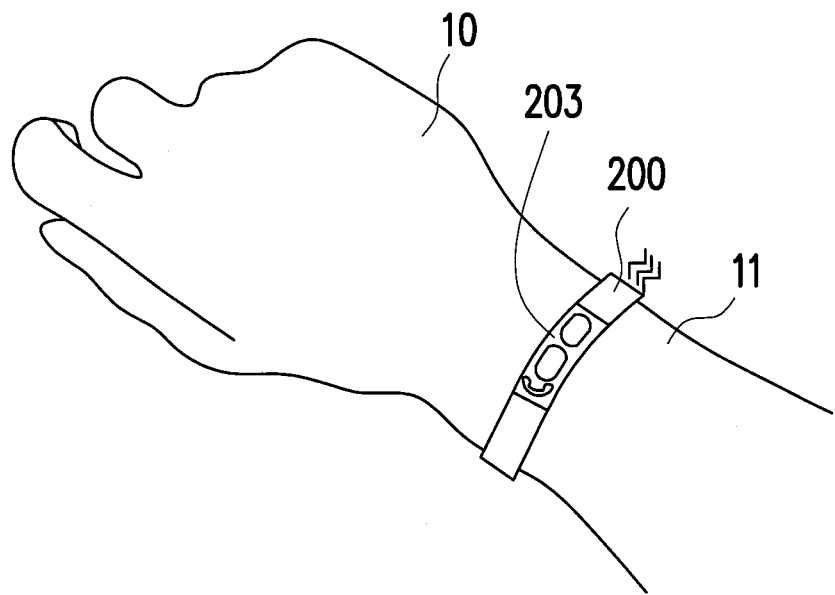
FIG. 9 is a conceptual diagram illustrating the wearable electronic device displaying the notification signal corresponding to the incoming event according to one of the exemplary embodiments of the disclosure.
Figure 10:
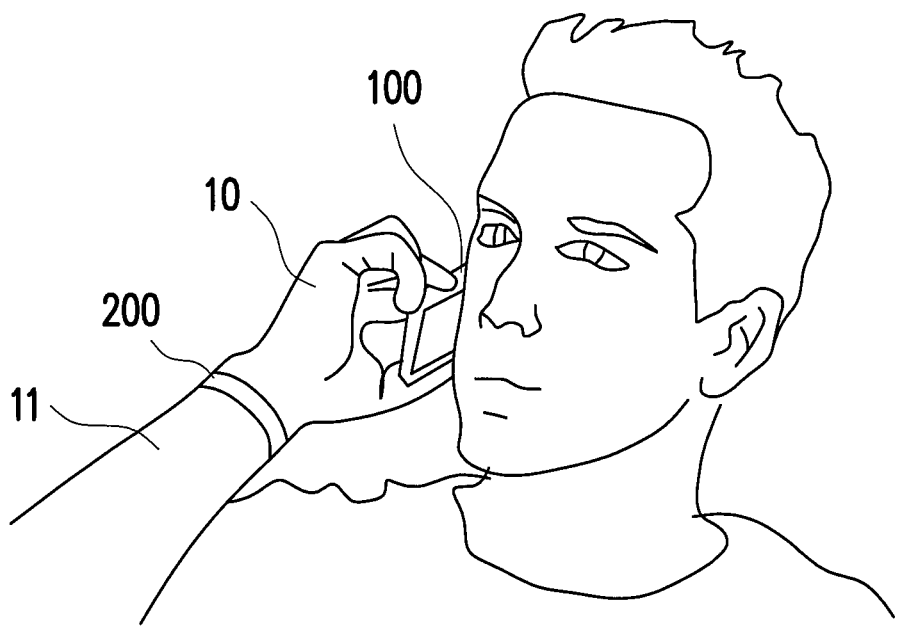
FIG. 10 is a conceptual diagram illustrating an operation of answering an incoming event based on the motion coherence between the mobile electronic device and the wearable electronic device according to one of the exemplary embodiments of the disclosure.

FIG. 9 is a conceptual diagram illustrating the wearable electronic device 200 displaying the notification signal corresponding to the incoming event according to one of the exemplary embodiment of the disclosure. FIG. 10 is a conceptual diagram illustrating an operation of answering an incoming event based on the motion coherence between the mobile electronic device 100 and the wearable electronic device 200 according to one of the exemplary embodiments of the disclosure.

With reference to FIGS. 8A, 8B and 10, the individual may response to the incoming event, which is an incoming phone call, by picking up the mobile electronic device 100 with the hand 10 corresponding to the arm 11 wearing the wearable electronic device 200. Similar to the exemplary embodiment illustrated in FIGS. 6A and 6B, a difference between the first motion data of the wearable electronic device 200 and the second motion data of the mobile electronic device 100 would be calculated. Steps S805, S807, S825, S827, and S829 are similar to the steps S605, S607, S625, S627, and S629 illustrated in FIGS. 6A and 6B, and thus the detail descriptions are omitted. In the exemplary embodiment illustrated in FIGS. 8A and 8B, in step S833, the processor 101 of the mobile electronic device 100 would further obtain a proximity signal from the proximity sensor 111b of the plurality of sensors 111 of the mobile electronic device 100 in addition to the determination of the movement coherence. Then, in step S835, processor 101 of the mobile electronic device 100 would execute an operation in response to the proximity signal.

In one of the exemplary embodiments of the disclosure, the individual who wears the wearable electronic device 200 may response to an incoming event such as an incoming text message, a calendar event, an alert and the likes according to the exemplary embodiment illustrated in FIGS. 6A, 6B, 7A, and 7B. For example, the individual may be notified of an incoming text message through the touch screen 203 of the wearable electronic device 200. As illustrated FIGS. 6A and 6B, the incoming text message may be view by simply pick up the mobile electronic device 100 with the hand corresponding to the arm wearing the wearable electronic device 200. That is, the touch screen 103 of the mobile electronic device 100 would automatically display the incoming message when the difference between the first motion data of the wearable electronic device 200 and the second motion data of the mobile electronic device 100 is within the predetermined threshold. It should be noted that the disclosure is not intended to limit the means for responding to the different incoming events, other combinations of the sensors and image capturing device utilized to respond to the different incoming events.

In one of the exemplary embodiment, the motion coherence between the mobile electronic device 100 and the wearable electronic device 200 would also be utilized to lock the mobile electronic device 100 and put the mobile electronic device 200 into a standby mode, automatically. In detail, a coherence of a downward movement between the mobile electronic device 100 and the wearable electronic device 200 would trigger a lock process. During the downward movement, the first motion data of the wearable electronic device 200 and the second motion data of the mobile electronic device 100 would detect and measure a downward acceleration. Accordingly, the mobile electronic device 100 would lock the mobile electronic device 100 and put into the standby mode. The mobile electronic device 100 may have a predetermined wait time before executing the locking the mobile electronic device 100. That is, after the detection of the downward movement, the mobile electronic device 100 may wait of a period of time defined by the predetermined wait time (e.g., 5 second) to determine whether another movement of the mobile electronic device 100 is produced again in coherence with the wearable electronic device 200 within the predetermined wait time. The exemplary embodiment is not intended to limit to the predetermined wait time which may be designed according to a practical application.

In one of the exemplary embodiments of the disclosure, the mobile electronic device 100 may further detect incoherence in motion between the movements of the mobile electronic device 100 and wearable electronic device 200 for the execution of locking the mobile electronic device 100. For example, an individual may put the mobile electronic device 100 away after an operation such as placing the mobile electronic device 100 on a table or in a packet. As the hand of the individual moving away from the mobile electronic device 100, the first motion data would indicate that the wearable electronic device 200 is moving toward a direction with a velocity different than the mobile electronic device 100. Accordingly, the mobile electronic device 100 would lock the mobile electronic device 100 and put into the standby mode.

In summary, disclosure provides a method for operating a mobile electronic device without giving a command from an individual. The operation of the mobile electronic device may be executed based on motion coherence between the mobile electronic device and a wearable electronic device. In detail, the motion data respectively obtained from the sensory devices of the mobile electronic device and the wearable electronic device would be compared to determine the movements of the mobile electronic device and the wrist electronic are coherence to each other. Accordingly, operations of the mobile electronic device may be executed.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for operating a mobile electronic device having a wireless transceiver and a sensor, and the method comprising:
   receiving, through the transceiver, a first motion data;
   detecting a second motion data from the sensor;
   calculating a difference between the first motion data and the second motion data, wherein the first motion data and the second motion data are measured during a same period; and
   executing an operation when the difference between the first motion data and the second motion data is within a predetermined threshold and when a second rotational angle representing an angular rotational movement of the mobile electronic device exceeds a predetermined angle and remain in a still position for a predetermined duration.

2. The method of claim 1, wherein the first motion data comprises a first acceleration data and a first rotational angle, and the second motion data comprises a second acceleration data and the second rotational angle.

3. The method of claim 1, further comprising:
   obtaining an image,
   wherein executing the operation when the difference between the first motion data and the second motion data is within the predetermined threshold comprises:
   executing the operation when the difference between the first motion data and the second motion data is within a predetermined threshold and when an object is detected in the image for a predetermined period through a facial detection.

4. The method of claim 1, further comprising:
   obtaining an incoming event; and
   transmitting a notification signal through the transceiver in response to the incoming event, wherein the operation is an execution of an application program associated with the incoming event.

5. The method of claim 4, further comprising:
   obtaining a proximity signal; and
   wherein executing the operation when the difference between the first motion data and the second motion data is within the predetermined threshold comprises:
   executing the operation in response to the proximity signal when the difference between the first motion data and the second motion data is within the predetermined threshold.

6. A mobile electronic device, comprising:
   a transceiver, receiving a first motion data;
   a sensor, detecting a second motion data representing a movement of the mobile electronic device; and
   a processor, configured for
   obtaining the second motion data and the first motion data;
   calculating a difference between the first motion data and the second motion data, wherein the first motion data and the second motion data are measured during a same period; and executing an operation when the difference between the first motion data and the second motion data is within a predetermined threshold and when a second rotational angle representing an angular rotational movement of the mobile electronic device exceeds a predetermined angle and remain in a still position for a predetermined duration.

7. The mobile electronic device of claim 6, wherein the first motion data comprises a first acceleration data and a first rotational angle, and the second motion data comprises a second acceleration data and the second rotational angle.

8. The mobile electronic device of claim 6, further comprising:
an image capturing device, obtaining an image,
wherein the processor is further configured for executing the operation when an object is detected in the image for a predetermined period through a facial detection.

9. The mobile electronic device of claim 6, wherein the processor is further configured for obtaining an incoming event and transmitting a notification signal through the transceiver in response to the incoming event, wherein the operation is an execution of an application program associated with the incoming event.

10. The mobile electronic device of claim 9, wherein the sensor is further configured for obtaining a proximity signal, and the processor is further configured for executing the operation in response to the proximity signal when the difference between the first motion data and the second motion data is within the predetermined threshold.

11. A non-transitory computer readable medium, storing programs to be loaded into a mobile electronic device having a transceiver and a sensor to perform steps of:
receiving, through the transceiver, a first motion data;
detecting a second motion data from the sensor;
calculating a difference between the first motion data and the second motion data, wherein the first motion data and the second motion data are measured during a same period; and
executing an operation when a difference between the first motion data and the second motion data is within a predetermined threshold and when a second rotational angle representing an angular rotational movement of the mobile electronic device exceeds a predetermined angle and remain in a still position for a predetermined duration.

12. A method for operating a mobile electronic device through a wearable electronic device, comprising:
detecting a first motion data representing a movement of the wearable electronic device by a motion sensor of the wearable electronic device; and
transmitting the first motion data through a transceiver of the wearable electronic device,
calculating wherein a difference between the first motion data and a second motion data is calculated by the mobile electronic device, and when the difference between the first motion data and the second motion data is within a predetermined threshold and when a second rotational angle representing an angular rotational movement of the mobile electronic device exceeds a predetermined angle and remain in a still position for a predetermined duration, executing an operation by the mobile electronic device is executed, wherein the first motion data and the second motion data are measured during a same period.

13. The method of claim 12, wherein the first motion data comprises a first acceleration data and a first rotational angle, and the second motion data comprises a second acceleration data and the second rotational angle.

14. The method of claim 12, further comprising:
receiving a notification signal through the transceiver of the wearable electronic device; and
displaying a message corresponding to the notification;
wherein the operation is an execution of an application program associated with the incoming event.

15. The method of claim 12, further comprising:
detecting a biometric signature;
comparing the biometric signature with a stored biometric signature; and
configuring the wearable electronic device as a hardware security key for operating the mobile electronic device when the biometric signature matches the stored biometric signature.

16. The method of claim 15, wherein the biometric signature comprises an electrocardiograms (ECG) data.

17. A wearable electronic device for operating a mobile electronic device, comprising:
a transceiver;
a motion sensor, detecting a first motion data representing a movement of the wearable electronic device; and
a processor, obtaining the first motion data from the motion sensor and transmitting the first motion data through the transceiver,
wherein the mobile electronic device calculates a difference between the first motion data and a second motion data is calculated, and when the difference between the first motion data and the second motion data is within a predetermined threshold and when a second rotational angle representing an angular rotational movement of the mobile electronic device exceeds a predetermined angle and remain in a still position for a predetermined duration, the mobile electronic device executes an operation is executed, wherein the first motion data and the second motion data are measured during a same period.

18. The wearable electronic device of claim 17, wherein the first motion data comprises a first acceleration data and a first rotational angle, and the second motion data comprises a second acceleration data and the second rotational angle.

19. The wearable electronic device of claim 17, further comprising:
a display screen,
wherein the processor is further configured for receiving a notification signal through the transceiver and displaying a message corresponding to the notification on the display screen, and
wherein the operation is an execution of an application program associated with the incoming event.

20. The wearable electronic device of claim 17, further comprising:
a biometric reader, detecting a biometric signature unique to an individual,
wherein the processor is further configured for obtaining the biometric signature and comparing the biometric signature with a stored biometric signature,
wherein the wearable electronic device is configured as a hardware security key when the biometric signature matches the stored biometric signature.

21. The wearable electronic device of claim 20, wherein the biometric signature comprises an electrocardiograms (ECG) data.

22. A non-transitory computer readable medium, storing programs to be loaded into a wearable electronic device to perform steps to operate a mobile electronic device, and the steps comprising:
- obtaining a biometric signature;
- comparing the biometric signature with a stored biometric signature to authorize the operation;
- configuring the wearable electronic device as a hardware security key for operating a mobile electronic device;
- detecting a first motion data representing a movement of the wearable electronic device; and
- transmitting the first motion data through a transceiver of the wearable electronic device,
- wherein the mobile electronic device compares the first motion data is compared to with a second motion data, and when a difference between the first motion data and the second motion data is within a predetermined threshold and when a second rotational angle representing an angular rotational movement of the mobile electronic device exceeds a predetermined angle and remain in a still position for a predetermined duration, the mobile electronic device executes an operation of the mobile electronic device is executed, wherein the first motion data and the second motion data are measured during a same period.

* * * * *